(12) United States Patent
Tamuli et al.

(10) Patent No.: US 11,966,364 B2
(45) Date of Patent: Apr. 23, 2024

(54) AUTOMATED METADATA MANAGEMENT FOR UNSTRUCTURED DATA STORAGE

(71) Applicant: Microsoft Technology Licensing, LLC, Redmond, WA (US)

(72) Inventors: Bidhan Tamuli, Bangalore (IN); Shrey Batra, Noida (IN); Rajat Gupta, Lucknow (IN); Harikumar Velayutham, Bangalore (IN)

(73) Assignee: Microsoft Tech LLC nology Licensing, LLC, Redmond, WA (US)

( * ) Notice: Subject to any disclaimer, the term of this patent is extended or adjusted under 35 U.S.C. 154(b) by 0 days.

(21) Appl. No.: 17/830,137

(22) Filed: Jun. 1, 2022

(65) Prior Publication Data

US 2023/0394007 A1    Dec. 7, 2023

(51) Int. Cl.
| | | |
|---|---|---|
| G06F 17/00 | (2019.01) | |
| G06F 7/00 | (2006.01) | |
| G06F 16/11 | (2019.01) | |
| G06F 16/13 | (2019.01) | |
| G06F 16/185 | (2019.01) | |

(52) U.S. Cl.
CPC ............ *G06F 16/13* (2019.01); *G06F 16/125* (2019.01); *G06F 16/185* (2019.01)

(58) Field of Classification Search
CPC ....... G06F 16/13; G06F 16/125; G06F 16/185
USPC .......................................................... 707/829
See application file for complete search history.

(56) References Cited

U.S. PATENT DOCUMENTS

| | | | | | |
|---|---|---|---|---|---|
| 5,490,258 | A | * | 2/1996 | Fenner ................ | H03M 7/4006 707/999.001 |
| 5,860,136 | A | * | 1/1999 | Fenner ................. | H04W 40/02 711/201 |
| 7,801,894 | B1 | * | 9/2010 | Bone ...................... | G06F 16/13 707/754 |
| 2006/0004847 | A1 | * | 1/2006 | Claudatos ............. | G06F 16/125 707/999.103 |
| 2006/0004868 | A1 | * | 1/2006 | Claudatos ............. | G06F 3/0649 707/999.107 |
| 2006/0053122 | A1 | * | 3/2006 | Korn ....................... | G06F 16/84 707/999.1 |
| 2010/0088317 | A1 | * | 4/2010 | Bone ..................... | G06F 16/134 709/219 |
| 2011/0035631 | A1 | * | 2/2011 | Bhinge ............ | G01R 31/31835 714/48 |
| 2016/0224798 | A1 | * | 8/2016 | Lim ....................... | H04L 63/104 |
| 2018/0189299 | A1 | * | 7/2018 | Jaggars .................. | G06F 16/84 |

* cited by examiner

*Primary Examiner* — Pavan Mamillapalli
(74) *Attorney, Agent, or Firm* — NICHOLSON DE VOS WEBSTER & ELLIOTT LLP

(57) ABSTRACT

Technologies for managing metadata of files in unstructured data storage are described. Embodiments include receiving, by selecting a set of datapath patterns. Embodiments include building an index from the selected set of datapath patterns that refers to at least one particular portion of a file path. Embodiments include receiving an identifier for the data file. Embodiments include matching the identifier to a datapath pattern of the set of datapath patterns using the index. Embodiments include determining a metadata label associated with the datapath pattern. Embodiments include associating the metadata label with the data file.

15 Claims, 6 Drawing Sheets

AUTOMATED METADATA MANAGEMENT FOR UNSTRUCTURED DATA STORAGE

TECHNICAL FIELD

The present disclosure generally relates to metadata management, and more specifically, relates to applying metadata to files in unstructured data storage.

BACKGROUND

Online platforms, such as digital marketplaces, store increasing amounts of information in unstructured data storage locations. Many online platforms store files in unstructured data storage without a predetermined schema or structure. As online systems and other processes are increasingly digitized, more and more data will be stored in unstructured data storage.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
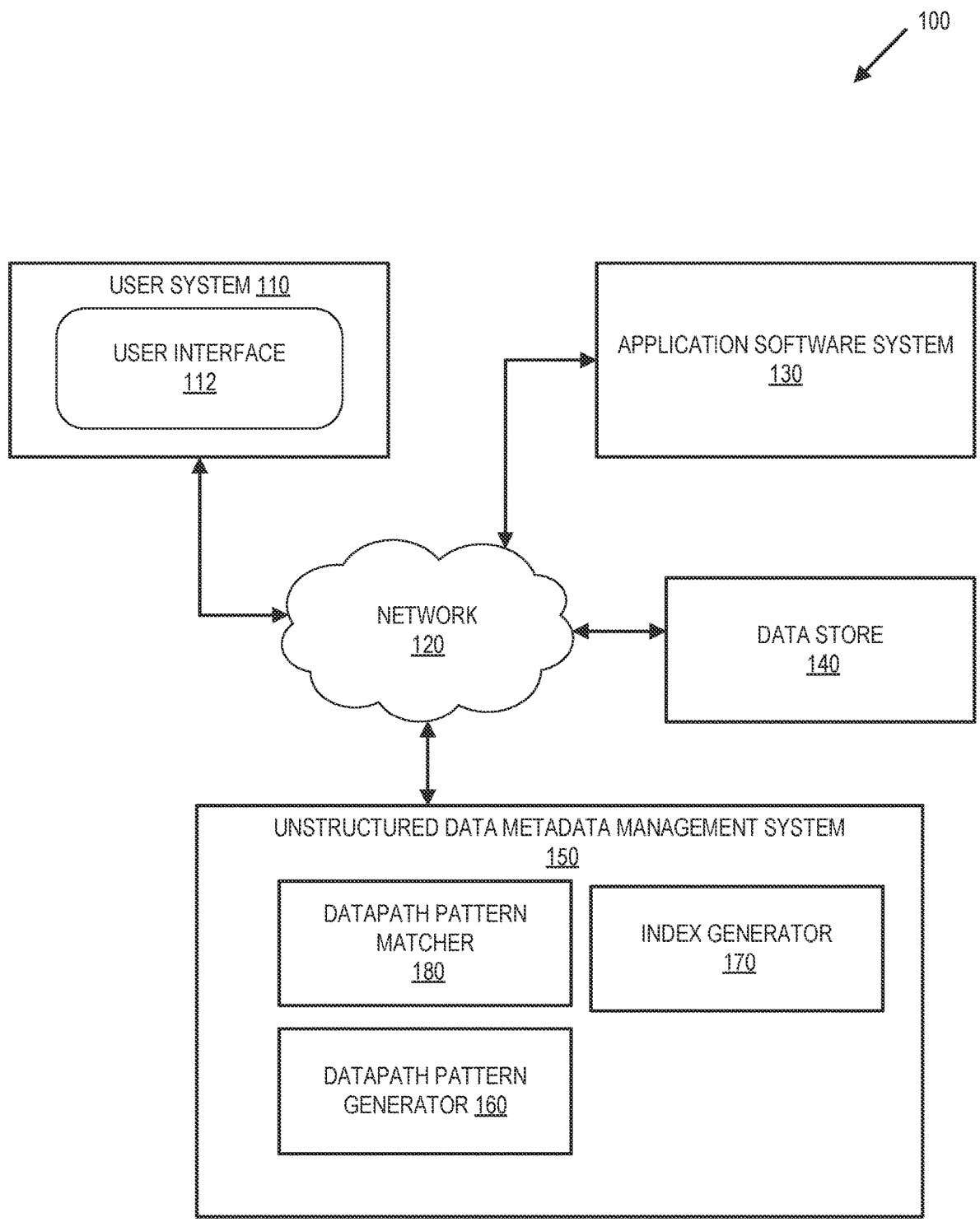
FIG. 1 illustrates a computing system that includes an unstructured data metadata management system in accordance with some embodiments of the present disclosure.

Unstructured data storage locations are used to store large amounts of data such as operating system data, text documents, or analytics data from an online platform. Unstructured data includes files stored without metadata or a predetermined format. The files within the unstructured data storage have a file structure but can be of any format and do not have a predetermined structure in contrast with a structured file with a defined schema (file organization). It is challenging to manage access control, data retention policies, and privacy compliance for unstructured data that has no metadata by which to implement policies at scale. Implementing any policies without metadata risks incorrectly removing a file that is required to be kept or retaining a file that should be removed. As described in more detail below, technologies disclosed herein are capable of automatically identifying files without metadata and using a datapath pattern to associate metadata with the files in an unstructured data storage to reduce inaccurate management of the files and the associated risks.

Examples of an unstructured data storage location include data lakes such as distributed file systems or cloud storage locations. Examples of "unstructured data" include text documents, audio files, video files, analog sensor data, images, and/or other unstructured text files in which the data contained within each file lacks a predefined structure. Examples of "metadata" include a retention policy, a security policy, or a user defined policy.

It has been a challenge to achieve compliance with regulatory policies and reduce the risks of incorrectly processing files that are not associated with any metadata. Without metadata, a risk of removing files that are necessary for system operation or retaining files that pose privacy risks can only be mitigated by an individual inspection of each file; however, individual file inspection approaches are not scalable to accommodate the size of modern data storage. As data storage continues to grow, a metadata management system that addresses these and other challenges is needed.

Existing unstructured data storage systems are able to monitor changes to individual files, implement security on the unstructured data storage system, and support a large variety of data types. However, due to a lack of metadata for the files, implementing broad data management policies across large collections of files often results in erroneous policies including improperly removing files that are necessary for system operation.

An additional challenge is presented if files that should be removed are retained because prolonged retention presents security and privacy risks. Furthermore, retaining unstructured data files without any purging mechanism risks disclosure of the files, violation of various regulatory requirements, or reduces the memory efficiency due to excess files that are stale and not actively needed by the system.

Another existing approach is to match strings in a file name against a large set of pattern matching expressions. For example, the pattern matching expressions can be organized in a tree structure, allowing the pattern matching expressions (e.g., regular expressions that specify a search pattern) to be searched for string or character matches. Due to the syntax of pattern matching expressions such as wildcards or globbing operators, this approach often results in duplicative matches or generates an erroneous output due to a syntax error in the pattern matching expression. Additionally, this string-matching approach is limited to a predefined expression syntax which supports a limited number of platforms and file structures.

In contrast, aspects of the present disclosure resolve all matching patterns to determine a single datapath pattern that applies to an absolute file path. For any absolute file path of a file, hundreds of datapath patterns will match portions of the absolute file path. Rather than simply finding all matching patterns such as results from the string matching above, aspects of the present disclosure use the context of hierarchical (e.g., directory or term) levels of the path patterns to resolve an absolute file path to a single datapath pattern that is a best match.

Aspects of the present disclosure address the above and other deficiencies by providing an unstructured data metadata management system that includes a datapath pattern generator to generate datapath patterns for target directories that contain multiple files. An example of a datapath pattern includes a file path pattern that identifies one or more target directories or files. A datapath pattern is generated from a file pattern and can include additional information such as ownership, a retention policy, and a file status for management of each datapath pattern. The unstructured data metadata management system includes a datapath pattern matcher that performs a matching between absolute file paths for the files in the unstructured data location with one or more datapath patterns.

FIG. 1 illustrates an example of a computing system 100 that includes an unstructured data metadata management system 150 in accordance with some embodiments of the present disclosure. Computing system 100 includes a user system 110, a network 120, an application software system 130, a data store 140, and an unstructured data metadata management system 150. An unstructured data metadata management system 150 includes a datapath pattern generator 160, index generator 170, and datapath pattern matcher 180.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 includes a front-end portion of application software system 130.

User interface 112 is any type of user interface as described above. User interface 112 is used to apply metadata policies, generate metadata, and view or otherwise perceive output that includes data produced by application software system 130. For example, user interface 112 includes a graphical user interface and/or a conversational voice/speech interface that includes a mechanism for creating a datapath, browsing an unstructured data storage location, or applying a policy to various files of the data store 140. Examples of user interface 112 include web browsers, command line interfaces, and mobile apps. User interface 112 as used herein includes application programming interfaces (APIs). In some embodiments, the user interface 112 is configured to receive input from a user and present data to the user. The user interface 112 receives inputs, such as from a user input device (not shown). For example, the user interface 112 presents data to the user requesting input, such as a policy implementation. The user interface 112 presents various media elements to the user including audio, video, image, haptic, or other media data.

Data store 140 is a memory storage. Data store 140 includes an unstructured data storage location, such as a data lake or central repository, including system files, user created files, and other files created in part by application software system 130. Data store 140 resides on at least one persistent and/or volatile storage device that resides within the same local network as at least one other device of computing system 100 and/or in a network that is remote relative to at least one other device of computing system 100. Thus, although depicted as being included in computing system 100, portions of data store 140 could be part of computing system 100 or accessed by computing system 100 over a network, such as network 120. For example, data store 140 could be part of a data storage system that includes multiple different types of data storage and/or a distributed data service. As used herein, data service could refer to a physical, geographic grouping of machines, a logical grouping of machines, or a single machine. For example, a data service could be a data center, a cluster, a group of clusters, or a machine.

Application software system 130 is any type of application software system that includes or utilizes functionality provided by unstructured data metadata management system 150. Examples of application software system 130 include but are not limited to file management software, connections network software, such as social media platforms, and systems that are or are not based on connections network software, such as general-purpose search engines, job search software, recruiter search software, sales assistance software, content distribution software, learning and education software, or any combination of any of the foregoing. Other examples of application software system 130 include but are not limited to digital commerce software, such as social media storefronts, and systems that are or are not based on digital commerce software, such as general-purpose software distribution platform, software repository, or software-as-a-service providers, or any combination of any of the foregoing.

While not specifically shown, it should be understood that any of user system 110, application software system 130, data store 140, unstructured data metadata management system 150, datapath pattern generator 160, index generator 170, and datapath pattern matcher 180 includes an interface embodied as computer programming code stored in computer memory that when executed causes a computing device to enable bidirectional communication with any other of user system 110, application software system 130, data store 140, unstructured data metadata management system 150, datapath pattern generator 160, index generator 170, and datapath pattern matcher 180 using a communicative coupling mechanism. Examples of communicative coupling mechanisms include network interfaces, inter-process communication (IPC) interfaces and application program interfaces (APIs).

A client portion of application software system 130 operates in user system 110, for example as a plugin or widget in a graphical user interface of a software application or as a web browser executing user interface 112. In an embodiment, a web browser transmits an HTTP request over a network (e.g., the Internet) in response to user input that is received through a user interface provided by the web application and displayed through the web browser. A server running application software system 130 and/or a server portion of application software system 130 receives the input, performs at least one operation using the input, and returns output using an HTTP response that the web browser receives and processes.

Each of user system 110, application software system 130, data store 140, unstructured data metadata management system 150, datapath pattern generator 160, index generator 170, and datapath pattern matcher 180 is implemented using at least one computing device that is communicatively coupled to electronic communications network 120. Any of user system 110, application software system 130, data store 140, unstructured data metadata management system 150, datapath pattern generator 160, index generator 170, and datapath pattern matcher 180 is bidirectionally communicatively coupled by network 120. User system 110 as well as one or more different user systems (not shown) could be bidirectionally communicatively coupled to application software system 130.

A typical user of user system 110 could be an administrator or end user of application software system 130, unstructured data metadata management system 150, datapath pattern generator 160, index generator 170, and/or datapath pattern matcher 180. User system 110 is configured to communicate bidirectionally with any of application software system 130, data store 140, unstructured data metadata management system 150, datapath pattern generator 160, index generator 170, and/or datapath pattern matcher 180 over network 120.

The features and functionality of user system 110, application software system 130, data store 140, unstructured data metadata management system 150, datapath pattern generator 160, index generator 170, and/or datapath pattern matcher 180 are implemented using computer software, hardware, or software and hardware, and includes combinations of automated functionality, data structures, and digital data, which are represented schematically in the figures. User system 110, application software system 130, data store 140, unstructured data metadata management system 150, datapath pattern generator 160, index generator 170, and/or datapath pattern matcher 180 are shown as separate elements in FIG. 1 for ease of discussion but the illustration is not meant to imply that separation of these elements is required. The illustrated systems, services, and data stores (or their functionality) could be divided over any number of physical systems, including a single physical computer system, and could communicate with each other in any appropriate manner.

Network 120 could be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

The computing system 100 includes an unstructured data metadata management system 150 that applies datapath pattern matcher 180 to a file of computing system 100 that is stored in an unstructured data location of data store 140. The unstructured data metadata management system 150 uses the datapath pattern matcher 180 to determine matching a datapath pattern from a node-based index to select a single datapath pattern that applies to an absolute file path of the file. The unstructured data metadata management system 150 associates metadata linked to the datapath pattern to the file.

Figure 6:
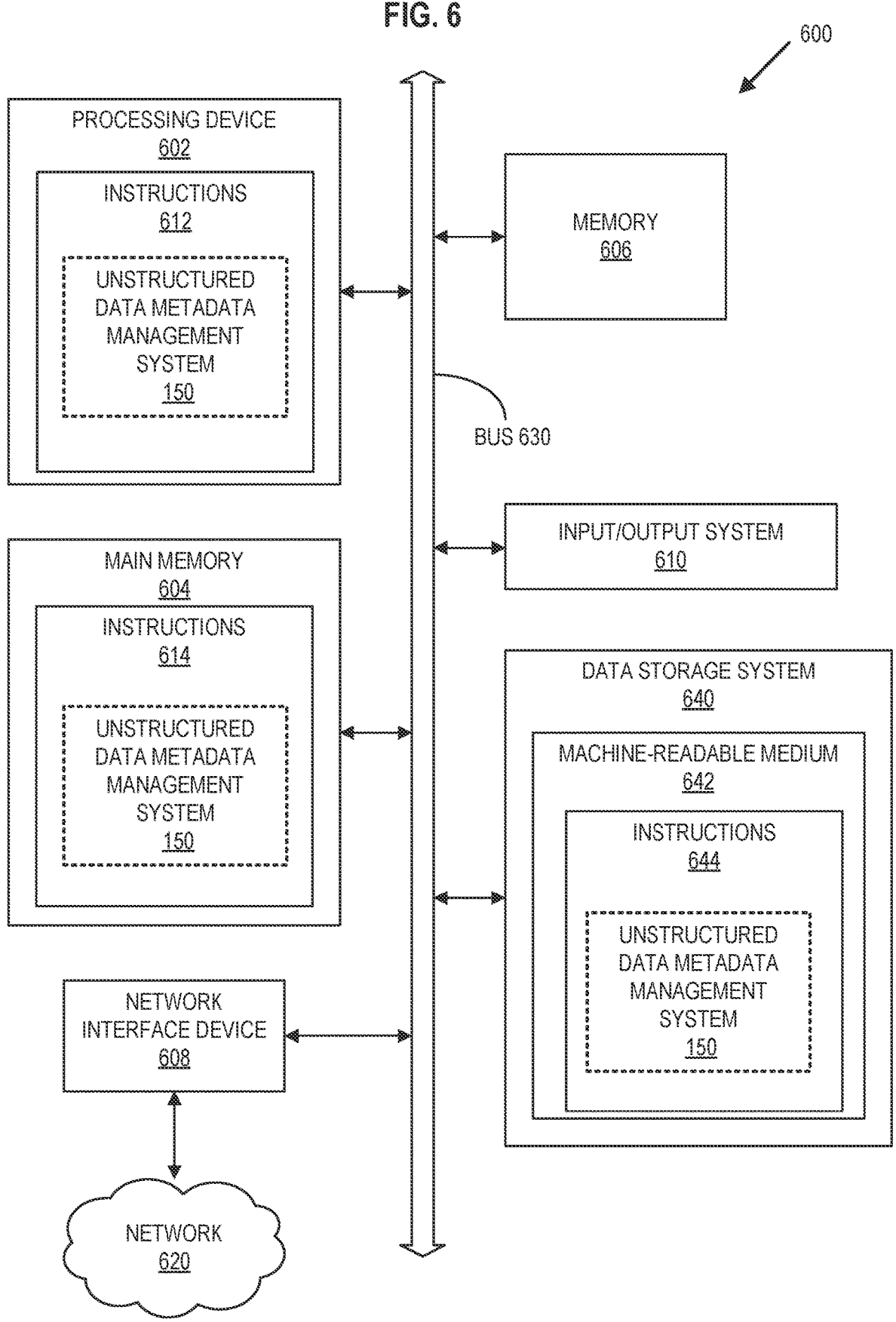
FIG. 6 is a block diagram of an example computer system for implementing an unstructured data metadata management system in accordance with some aspects of the present disclosure.

In some embodiments, the application software system 130 includes at least a portion of the datapath pattern generator 160 and/or index generator 170. As shown in FIG. 6, the unstructured data metadata management system 150 could be implemented as instructions stored in a memory, and a processing device 602 could be configured to execute the instructions stored in the memory to perform the operations described herein.

The unstructured data metadata management system 150 provides identification, assignment, and enforcement of file policies for an unstructured data storage location. While unstructured data metadata management system 150 is described as an executable application, in some embodiments, the unstructured data metadata management system 150 could be implemented in specialized hardware or as a cloud Software or as a Service (SaaS) application. The disclosed technologies are described with reference to an example use case of managing metadata for files in unstructured data storage locations for an online system. The disclosed technologies are not limited to online platforms but could be used to manage unstructured data storage media more generally. The disclosed technologies could be an on-premise or off-premise cloud computing storage, or other distributed file systems.

The unstructured data metadata management system 150 of FIG. 1 includes the datapath pattern generator 160, the index generator 170, and datapath pattern matcher 180. Some embodiments of the datapath pattern generator 160 include an executable module that receives multiple components and generates a datapath pattern. In some embodiments, the unstructured data metadata management system 150 receives inputs to generate a datapath pattern that include a file path pattern (e.g., a target directory), a platform (e.g., a data lake such as AZURE, HDFS, AWS), and a server type (e.g., production, development, sandbox, etc.), or any combination of the foregoing.

In one example, the datapath pattern generator 160 requests the inputs (e.g., file path pattern, platform, server type, etc.) for the datapath pattern from a user of the unstructured data metadata management system 150. The datapath pattern generator 160 also requests a set of linked metadata for each datapath pattern including an owner list (e.g., one or more creators), a retention policy, an audit status, and a file status. The linked metadata is stored in the data store 140 with an identifier associated with the datapath pattern. The datapath pattern generator 160 generates a datapath pattern from the inputs and the linked metadata. Additional details of the datapath pattern are described below with respect to FIG. 2.

The index generator 170 assigns a unique key to each of the datapath patterns created by the datapath pattern generator 160. The index generator 170 aggregates all of the unique keys into a searchable node-based index with each set of nodes corresponding to a file path pattern. Each unique key is an identifier that connects the linked metadata of the datapath pattern to the set of nodes within the node-based index. The unique key is used to distinguish between datapath patterns which have one or more nodes in common.

In some embodiments, the index generator 170 generates a node-based index with each distinct path of nodes corresponding to a set of terms of a file path pattern of a datapath pattern. The index generator 170 generates levels of nodes based on the relationship between directory and sub-directories with each sub-directory having a corresponding level of nodes. In one example, for a file path pattern with a datapath pattern of "/production/users/user1/", the index generator 170 would generate a set of nodes including ["production", "users", "user1", ""] and a unique key for this combination of nodes. In another example, another file path pattern could have the datapath pattern of "/production/users/" and the index generator 170 would generate a set of nodes including ["production", "users", ""] and a different key to distinguish this datapath pattern from the previous example even though two nodes are common between the datapath patterns.

The datapath pattern matcher 180 compares an absolute file path of a file in the unstructured data storage location (such as data store 140) with one or more of the datapath patterns in the index. The datapath pattern matcher 180 decomposes the absolute file path into a set of terms using one or more delimiters such as "/" in the absolute file path. In a non-limiting example, an absolute file path of "/users/abce/appdata/main.py" would be decomposed into the set of terms ["users", "abcde", "appdata", "main.py"]. The datapath pattern matcher 180 performs a search of the index for the set of terms to determine one or more matching datapath patterns for the terms of the absolute file path.

Continuing with the present example, the datapath pattern matcher 180 determines an exact match of a set of terms for an absolute file path and a set of nodes in the index. In this case, the datapath pattern matches an absolute file path to the set of nodes down to an individual file level including "/users/abce/appdata/main.py". The datapath pattern matcher 180 uses the unique key in the index to identify the linked metadata for the matching datapath pattern and outputs the linked metadata to the user system 110 or associates the linked metadata to the file in a metadata store.

In another example, the datapath pattern matcher 180 receives an absolute file path of "/production/users/user1/script.py". The absolute file path is again decomposed by the datapath pattern matcher 180 into a set of terms representing the absolute file path. In this example, the datapath pattern matcher 180 determines no exact matches are present in the index. The datapath pattern matcher 180 compares each set of nodes in the index with the set of terms. The datapath pattern matcher 180 identifies multiple matches including "/production/users/" and "/production/users/user1/". The datapath pattern matcher 180 handles multiple matches by removing any static terms from the set of terms associated with the absolute file path. In this example, the server policy is that all users store files under "/production/users/" in a directory specific to each user. Thus, for all files created by users, a portion of each absolute file path, specifically "/production/users" is common to all absolute file paths and these terms are identified as static terms.

The datapath pattern matcher 180 removes the static terms from the set of terms and compares the remaining terms in the set of terms to the index. In this example, the datapath pattern matcher 180 determines that "/production/users/user1/" is a better match than the more general "/production/users/" which only includes static terms. The datapath pattern matcher 180 identifies the unique key associated with "/production/users/user1/**" and retrieves the linked metadata for association to the file.

After retrieving the linked metadata (in either example or both), the unstructured data metadata management system 150 can present the linked metadata using the user interface 112 or automatically apply the linked metadata to the file in the data store 140.

In some embodiments, the unstructured data metadata management system 150 applies one or more pruning keys to reduce the complexity of the index and improve efficiency of the datapath pattern matcher 180. An example of a pruning key is a static directory path for a number of levels preceding a delimiter in the file path pattern (e.g., "/server/use r/"). By applying the pruning keys, the unstructured data metadata management system 150 groups the datapath patterns with the same pruning key into separate node-based structures. In some embodiments, the index generator 170 can perform this function by generating a node-based index for each set of static terms. Removing the static terms by pruning the static nodes improves performance in terms of faster queries, and easier maintenance in ensuring each node-based index represents the current file structure of the unstructured data storage. Additionally, by reducing the size of each node-based index using the pruning keys, the system is scalable to support any number of data points for each unstructured data storage in any distributed data storage system.

Further details regarding an example architecture of the unstructured data metadata management system, datapath pattern generator, index generator, and datapath pattern matcher are described below.

Figure 2:
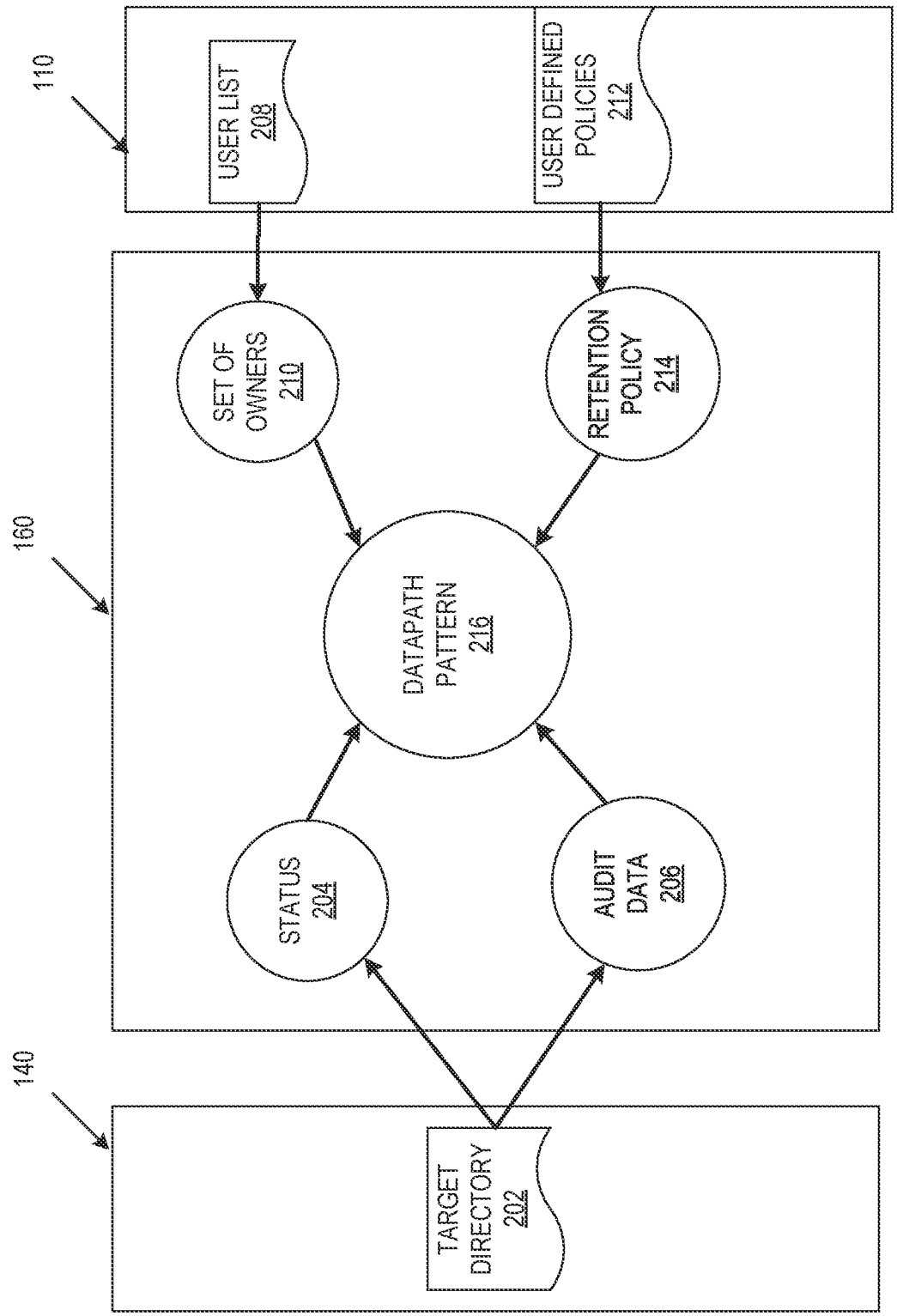
FIG. 2 is an example of a process to generate datapath patterns in accordance with some embodiments of the present disclosure.

FIG. 2 is an example process of the generating datapath patterns in accordance with some embodiments of the present disclosure.

The unstructured data metadata management system 150 includes a datapath pattern generator 160 that receives inputs from the data store 140 and the user system 110 to generate a datapath pattern 216. As described above, the datapath pattern generator 160 receives a file pattern 202, a platform of the data store 140, and/or a server type of the data store 140 from the user system 110 to generate a datapath pattern 216. The datapath pattern generator 160 can also receive additional information for association with the datapath pattern 216 as linked metadata. In some embodiments, the additional information includes a status 204 and audit data 206 of the datapath pattern 216. The status 204 includes system information relating the datapath pattern 216 that indicates an active status, inactive status, or another status for performing management of the datapath pattern 216. Examples of the status 204 include active access permissions, and/or a last modified date of the datapath pattern. The audit data 206 includes system information relating to changes in the access permissions or an ownership change of the datapath pattern 216.

In some embodiments the datapath pattern generator 160 receives a set of owners 210 and a retention policy 214 from the user system 110. For example, a user can select the set of owners 210 from a user list 208 that includes authorized users of the computing system 100. Additionally, the user can select the retention policy 214 from one or more policies within a set of user defined policies 212. In some examples, additional policies such as access permissions, privacy policies, or other data governance policies are selectable from the user defined policies 212. The datapath pattern generator 160 can generate a set of linked metadata for the datapath pattern 216 including the platform, the server type, the set of owners 210, the retention policy 214, status 204, or audit data 206. In some embodiments, the set of linked metadata for the datapath pattern 216 is used to perform management of multiple datapath patterns.

Figure 3:
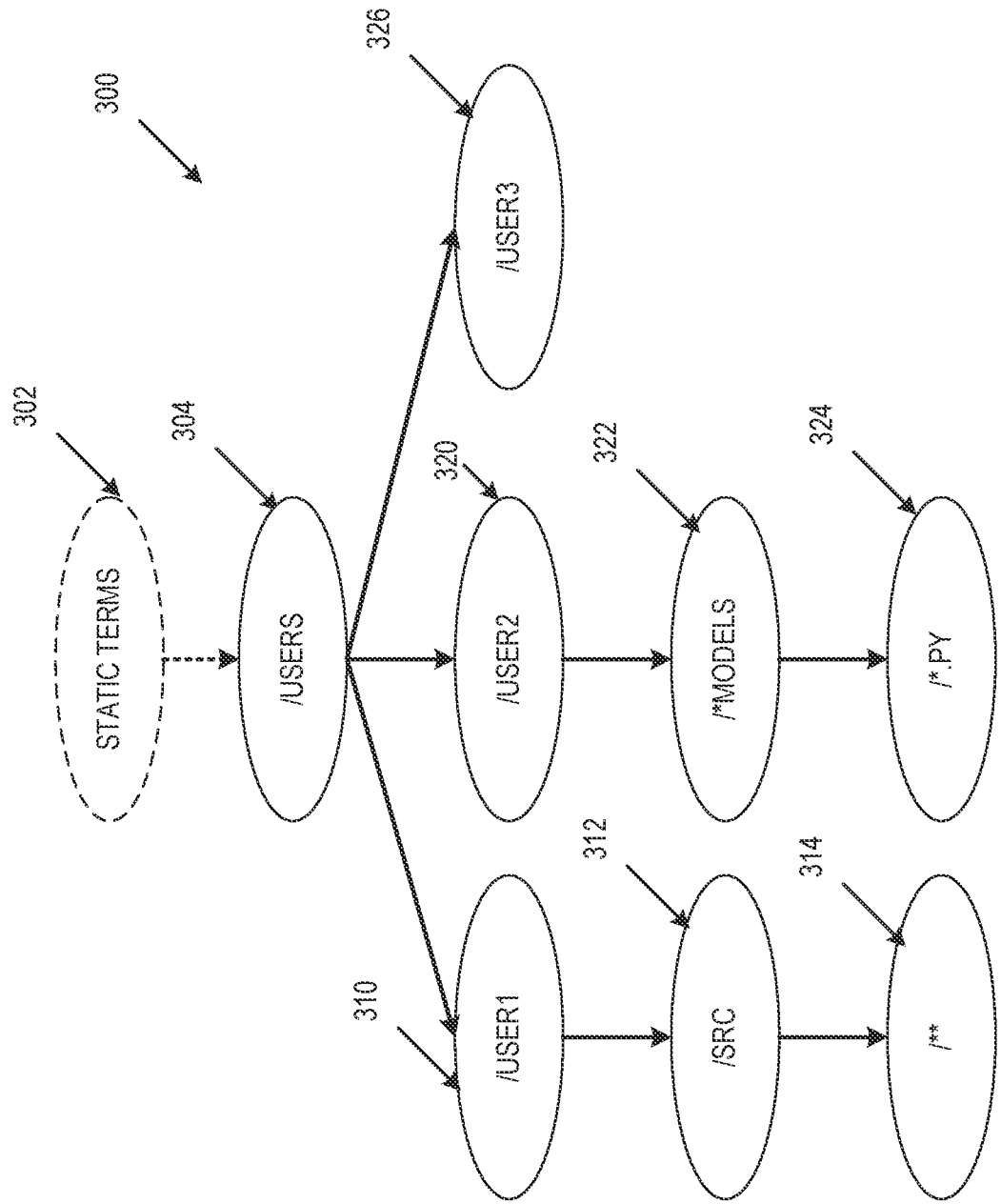
FIG. 3 is an example of a node-based index for datapath pattern matching in accordance with some embodiments of the present disclosure.

FIG. 3 is an example of a node-based index for datapath pattern matching in accordance with some embodiments of the present disclosure.

As described above, the index generator 170 can generate a node-based index 300 using the target directory of each datapath pattern. The node-based index 300 represents multiple datapath patterns for various target directories of the unstructured data storage. For example, a first datapath pattern includes node 302, node 304, node 310, node 312, and node 314 to represent a target directory of "//users/user1/src/" with the first "" indicating a globbing for multiple levels that include the static terms of node 302 and any directories above "/users/". The second "" indicates the datapath pattern will match every file within the "/src" directory of user1's files. Continuing with the same example, a second datapath pattern includes node 302, node 304, node 320, node 322, and node 324 to represent the target directory "/**/users/user2/src/*models/*.py" with "*" indicating the globbing for the multiple levels that include the static terms of node 302 and any directories above "/users/". The first "*" indicates a globbing of the single directory and the second "*" indicates the datapath pattern will match every file ending in a ".py" file extension within the "/*models/directory. Continuing with the same example, a third datapath pattern includes node 302, node 304, and node 326. Similar to the previous two datapath patterns, the third datapath pattern will match all files of user3. Additional datapath patterns can include subsets of the first datapath pattern, the second datapath pattern, or the third datapath pattern. In an example, an additional datapath pattern includes "//users/user[2-3]/" which matches every file under "//users/user2/" and "//users/user3/".

As illustrated in FIG. 3, the unstructured data metadata management system has applied a pruning key to the static terms of node 302 and the dashed lines indicate that the static terms of node 302 are removable from the node-based index 300. The index generator 170 identifies terms of the target directories and generates a node for each term. In some embodiments, the index generator 170 produces a set of node-based indices that are grouped by a pruning key. For instance, the index generator 170 produces a node-based index with the pruning key of "/production/userdata" for use with datapath pattern matching of user data while another node-based index (not shown) has a pruning key of "/system/logs" for use with operating system generated files such as various logs of events, errors, user actions, or other system generated data.

Figure 4:
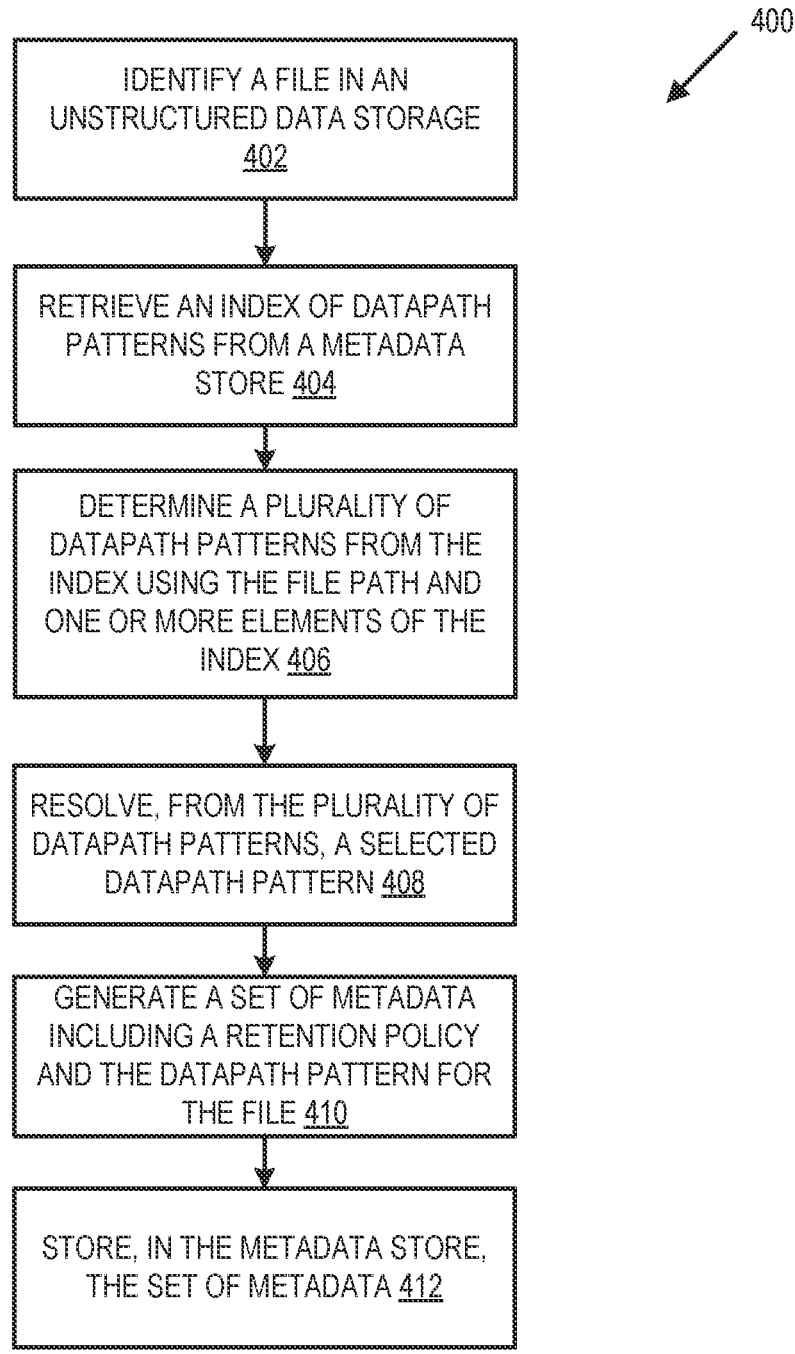
FIG. 4 is an example of a process for managing metadata for files in unstructured data storage in accordance with some embodiments of the present disclosure.

FIG. 4 is a flow diagram of an example method 400 of managing metadata of an unstructured data storage in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by portions of the unstructured data metadata management system 150 of FIG. 1.

Although shown in a particular sequence or order, unless otherwise specified, the order of the processes could be modified. Thus, the illustrated embodiments should be understood only as examples, and the illustrated processes could be performed in a different order, and some processes could be performed in parallel. Additionally, one or more processes could be omitted in various embodiments. Thus, not all processes are required in every embodiment. Other process flows are possible.

At operation 402, the unstructured data metadata management system identifies a file in an unstructured data storage location. The unstructured data metadata management system performs a search of the unstructured data storage location for any files that lack metadata as described above. The unstructured data metadata management system receives an absolute file path of each file lacking metadata from the unstructured data storage location.

At operation 404, the unstructured data metadata management system retrieves an index of datapath patterns from a metadata store. The unstructured data metadata management system accesses the metadata store to retrieve a set of datapath patterns and unique keys. In some embodiments, the unstructured data metadata management system retrieves a portion of the index by applying a pruning key representing a static portion of the absolute file path to the index. In other embodiments, the index has a pruning key applied during creation and the unstructured data metadata management system selects the node-based index corresponding to the pruning key that matches the static portion of the absolute file path.

At operation 406, unstructured data metadata management system determines a plurality of datapath patterns from the index using the absolute file path and one or more elements of the index. For example, the unstructured data metadata management system applies the datapath pattern matcher (e.g., datapath pattern matcher 180) to compute a set of matches from the absolute file path and the target directory of the index. As described above, the datapath pattern matcher identifies all potential matches using a node-based index structure by decomposing the terms of the absolute file path and performing node to term matching. In some embodiments, the datapath pattern matcher determines that a match exists when the datapath pattern in the node-based index matches one or more portions of the absolute file path. For some absolute file paths, multiple datapath patterns can match varying portions and the unstructured data metadata management system selects a datapath pattern that is a best match as described below with regard to operation 408.

At operation 408, unstructured data metadata management system applies the datapath pattern matcher to resolve a selected datapath pattern from multiple matching datapath patterns. For example, the datapath pattern matcher selects a datapath pattern that is a best match for the absolute file path. In some embodiments, the datapath pattern matcher selects the datapath pattern that matches the most terms of the absolute file path. In an example from FIG. 3, if the absolute file path is "/users/user2/models/test.js", the datapath pattern matcher 180 determines that no exact match is present in the index as "users/user2/*models/*.py" only matches python files within the directory and the absolute file path indicates only JavaScript files will match. The datapath pattern matcher determines that "users/user2/*models" is a better match than the more general "/users" or "users/user2" that also match portions of the absolute file path. The datapath pattern matcher identifies the unique key associated with "users/user2/*models/" and generates or retrieves the linked metadata associated with the unique key.

At operation 410, the unstructured data metadata management system generates a set of metadata including a retention policy and the datapath pattern for the file associated with the unique key. The set of metadata includes a set of permissions and file disposition rules from the inputs received from the user during creation of the datapath pattern. In some embodiments, the set of metadata defines a mandatory retention period for the file and one or more conditions required for removal or purging of the file. Examples of the mandatory retention period include a time interval and a reason such as "7 years, legal compliance" or "permanent, system record." Examples of conditions required for removal include "owner no longer an authorized user" or "privacy regulation delete if requested by owner."

At operation 412, the unstructured data metadata management system stores the set of metadata in the metadata store. In some embodiments, the unstructured data metadata management system writes the set of metadata to data store 140. The set of metadata includes a unique key associated with the datapath pattern and the file.

Figure 5:
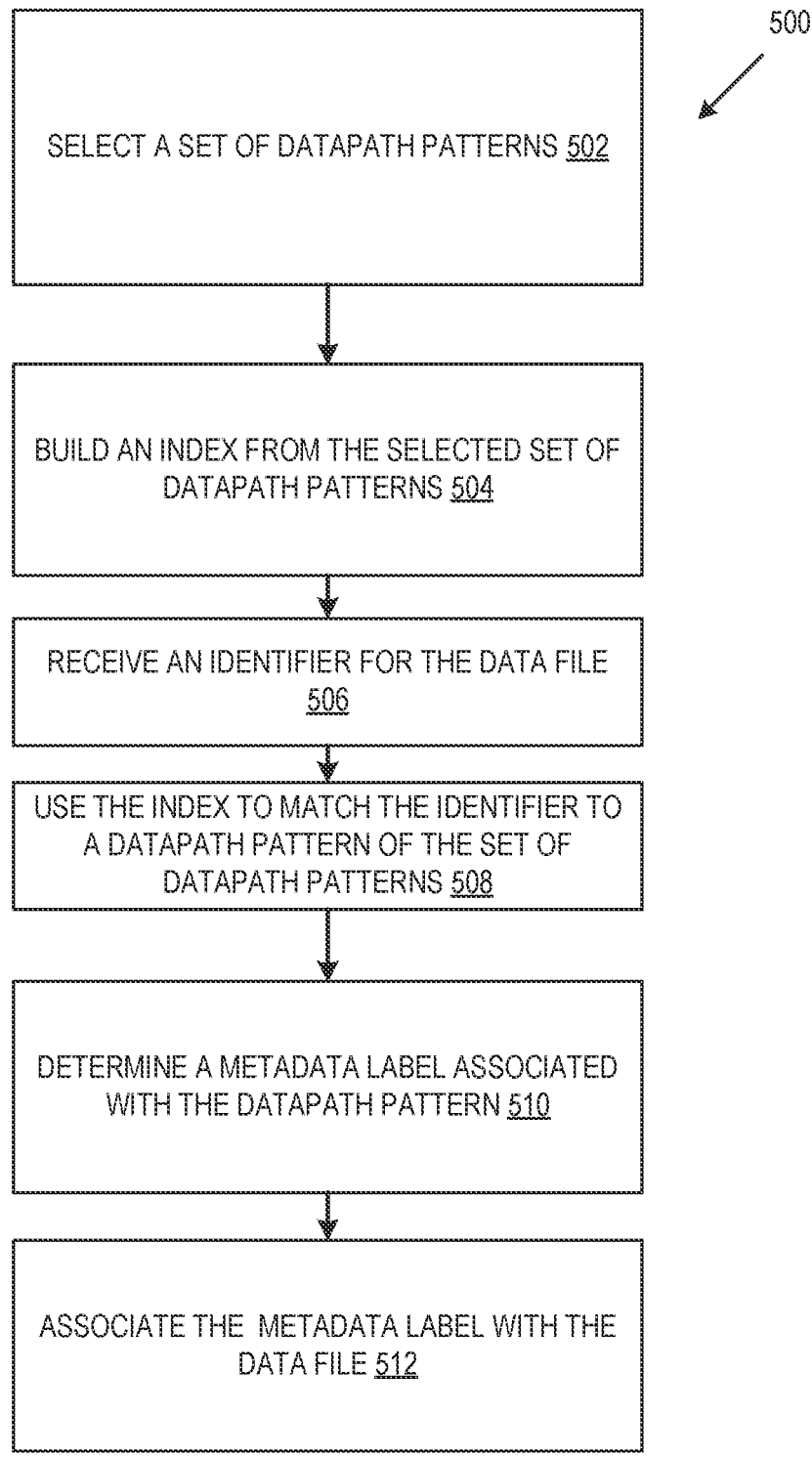
FIG. 5 is another example of a process for managing metadata for files in unstructured data storage in accordance with some embodiments of the present disclosure.

FIG. 5 is a flow diagram of another example method 500 of managing metadata of an unstructured data storage in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by portions of the unstructured data metadata management system 150 of FIG. 1.

Although shown in a particular sequence or order, unless otherwise specified, the order of the processes could be modified. Thus, the illustrated embodiments should be understood only as examples, and the illustrated processes could be performed in a different order, and some processes could be performed in parallel. Additionally, one or more processes could be omitted in various embodiments. Thus, not all processes are required in every embodiment. Other process flows are possible.

At operation 502, the unstructured data metadata management system selects a set of datapath patterns. In some embodiments, the unstructured data metadata management system retrieves datapath patterns from a library of datapath patterns that have been previously defined. The unstructured data metadata management system performs this selection using a server type, a platform, or a pruning key associated with a target directory of a file.

At operation 504, the index generator builds an index from the selected set of datapath patterns. In some embodiments, the index generator generates a node-based tree structure for the selected set of datapath patterns. Each node of the node-based tree structure corresponds to a term of the datapath pattern and a directory or sub-directory of an absolute file path of the data file. The index generator assigns a set of nodes to a corresponding datapath pattern using a unique key for each datapath to distinguish distinct datapaths that have one or more nodes in common.

At operation 506, the unstructured data metadata management system receives an identifier for the data file. In some embodiments, the identifier of the data file is an absolute file path associated with the location of the data file in the unstructured data storage.

At operation 508, the datapath pattern matcher matches the identifier to a datapath pattern of the set of datapath patterns. The datapath pattern matcher determines that two or more datapath patterns of the set of datapath patterns match the identifier for the data file. In some embodiments, the identifier of the data file includes an absolute file path of the data file. The datapath pattern matcher determines that more than one datapath pattern matches a portion of the absolute file path. The datapath pattern matcher resolves the identifier of the data file to a single datapath pattern by comparing each of the two or more datapath patterns to the identifier. For example, the datapath pattern matcher computes a similarity between each of the two or more datapath patterns and selects the datapath pattern that is a best match using the similarity. In some embodiments, the similarity is computed as the lowest level of matching terms in the absolute file path of the data file and the set of terms in the datapath pattern. For instance, a matching datapath pattern down to the lowest level would indicate an exact match of the absolute file path and the datapath pattern. Other levels of matching can include various directories or sub-directories that are in common between the absolute file path of the data file and the datapath pattern.

In another example, the datapath pattern matcher searches a node-based index to identify a number of nodes in a hierarchical structure that correspond to the identifier. The datapath pattern matcher identifies two or more sets of nodes from the node-based index, with each set of nodes corresponding to different datapath patterns. After the two or more sets of nodes are identified as matches, the datapath pattern matcher performs a node-wise comparison of the number of nodes in the hierarchical structure and each set of nodes from the two or more sets of nodes. A percentage of the number of nodes in each set of nodes that correspond to the identifier is computed and the datapath pattern matcher selects the datapath pattern with a greater percentage of matching nodes.

At operation 510, the unstructured data metadata management system determines a metadata label associated with the datapath pattern. Similar to operations described above with regard to operation 410, the unstructured data metadata management system generates a label that indicates a set of permissions and file disposition rules from the datapath pattern. In one example, the label can indicate a sensitivity, a retention rule, or a regulation to which the file is subject (e.g., a privacy rule, a records disposition rule, etc.). In some embodiments, the metadata label indicates one or more conditions required for modification, removal, or extended retention of the file.

At operation 512, the unstructured data metadata management system associates the metadata label with the data file. In some embodiments, the unstructured data metadata management system stores an association between the metadata label and the data file. The metadata label can be associated by incorporating the unique identifier associated with the datapath pattern and the file into a portion of the metadata label.

FIG. 6 illustrates an example machine of a computer system 600 within which a set of instructions, for causing the machine to perform any one or more of the methodologies discussed herein, could be executed. In some embodiments, the computer system 600 corresponds to a component of a networked computer system (e.g., the computing system 100 of FIG. 1) that includes, is coupled to, or utilizes a machine to execute an operating system to perform operations corresponding to the unstructured data metadata management system 150 of FIG. 1.

The machine could be connected (e.g., networked) to other machines in a local area network (LAN), an intranet, an extranet, and/or the Internet. The machine operates in the capacity of a server or a client machine in a client-server network environment, as a peer machine in a peer-to-peer (or distributed) network environment, or as a server or a client machine in a cloud computing infrastructure or environment.

The machine could be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a memory 606 (e.g., flash memory, static random-access memory (SRAM), etc.), an input/output system 610, and a data storage system 640, which communicate with each other via a bus 630.

The main memory 604 is configured to store instructions 614 for performing the operations and steps discussed herein. Instructions 614 include portions of unstructured data metadata management system 150 when those portions of unstructured data metadata management system 150 are stored in main memory 604. Thus, unstructured data metadata management system 150 is shown in dashed lines as part of instructions 614 to illustrate those portions of unstructured data metadata management system 150 could be stored in main memory 604. However, it is not required that unstructured data metadata management system 150 be embodied entirely in instructions 614 at any given time and portions of unstructured data metadata management system 150 could be stored in other components of computer system 600.

Processing device 602 represents one or more general-purpose processing devices such as a microprocessor, a central processing unit, or the like. More particularly, the processing device could be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 could be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions of unstructured data metadata management system 150 when those portions of unstructured data metadata management system 150 are being executed by processing device 602. Thus, similar to the description above, unstructured data metadata management system 150 is shown in dashed lines as part of instructions 612 to illustrate that, at times, portions of unstructured data metadata management system 150 are executed by processing device 602. For example, when at least some portion of unstructured data metadata management system 150 is embodied in instructions to cause processing device 602 to perform the method(s) described above, some of those instructions could be read into processing device 602 (e.g., into an internal cache or other memory) from main memory 604 and/or data storage system 640. However, it is not required that all of unstructured data metadata management system 150 be included in instructions 612 at the same time and portions of unstructured data metadata management system 150 are stored in one or more other components of computer system 600 at other times, e.g., when one or more portions of unstructured data metadata management system 150 are not being executed by processing device 602.

The computer system 600 further includes a network interface device 608 to communicate over the network 620. Network interface device 608 provides a two-way data communication coupling to a network. For example, network interface device 608 could be an integrated-services digital network (ISDN) card, cable modem, satellite modem, or a modem to provide a data communication connection to a corresponding type of telephone line. As another example, network interface device 608 could be a local area network (LAN) card to provide a data communication connection to a compatible LAN. Wireless links could also be implemented. In any such implementation network interface device 608 sends and receives electrical, electromagnetic, or optical signals that carry digital data streams representing various types of information.

The network link provides data communication through at least one network to other data devices. For example, a network link provides a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system 600.

Computer system 600 sends messages and receives data, including program code, through the network(s) and network interface device 608. In the Internet example, a server transmits a requested code for an application program through the network interface device 608. The received code could be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 includes an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information includes voice commands, audio signals, geographic location information, and/or digital imagery, for example.

The data storage system 640 includes a machine-readable storage medium 642 (also known as a computer-readable medium) which is stored in one or more sets of instructions 644 or software embodying any one or more of the methodologies or functions described herein. The instructions 644 also resides, completely or at least partially, within the main memory 604 and/or within the processing device 602 during execution thereof by the computer system 600, the main memory 604 and the processing device 602 also constitutes machine-readable storage media.

In one embodiment, the instructions 644 include instructions to implement functionality corresponding to a solver-based media assignment application (e.g., unstructured data metadata management system 150 of FIG. 1). Unstructured data metadata management system 150 is shown in dashed lines as part of instructions 644 to illustrate that, similar to the description above, portions of unstructured data metadata management system 150 could be stored in data storage system 640 alternatively or in addition to being stored within other components of computer system 600.

Dashed lines are used in FIG. 6 to indicate that it is not required that unstructured data metadata management system 150 be embodied entirely in instructions 612, 614, and 644 at the same time. In one example, portions of unstructured data metadata management system 150 are embodied in instructions 644, which are read into main memory 604 as instructions 614, and portions of instructions 614 are read into processing device 602 as instructions 612 for execution. In another example, some portions of unstructured data metadata management system 150 are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Illustrative examples of the technologies disclosed herein are provided below. An embodiment of the technologies could include any of the examples or a combination of the described below.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure refers to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus could be specially constructed for the intended purposes, or include a general-purpose computer selectively activated or reconfigured by a computer program stored in the computer. For example, a computer system or other data processing system, such as the unstructured data metadata management system 150 could carry out the computer-implemented processes in response to its processor executing a computer program (e.g., a sequence of instructions) contained in a memory or other non-transitory machine-readable storage medium. Such a computer program could be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems could be used with programs in accordance with the teachings herein, or it proves convenient to construct a more specialized apparatus to perform the method. The structure for a variety of these systems will appear as set forth in the description below. In addition, the present disclosure is not described with reference to any particular programming language. It will be appreciated that a variety of programming languages could be used to implement the teachings of the disclosure as described herein.

The present disclosure could be provided as a computer program product, or software, which includes a machine-readable medium having stored thereon instructions, which could be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications could be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for applying metadata to a data file in an unstructured data storage, the method comprising:
    selecting a set of datapath patterns, wherein a datapath pattern comprises a reference to at least one particular portion of a file path;
    building an index from the selected set of datapath patterns by receiving a plurality of datapath patterns from the set of datapath patterns, identifying a pruning key to each of the datapath patterns of the plurality of datapath patterns, wherein the pruning key is a static portion of each datapath pattern, removing the pruning key from each datapath pattern of the plurality of datapath patterns, and in response to removing the pruning key, adding each datapath pattern to the index;
    receiving an identifier for the data file;
    using the index, matching the identifier to a datapath pattern of the set of datapath patterns:
    determining a metadata label associated with the datapath pattern; and
    associating the metadata label with the data file.

2. The method of claim 1, wherein the metadata label includes a reference to a file retention policy.

3. The method of claim 1, wherein matching the identifier to the datapath pattern of the set of datapath patterns comprises:
    determining two or more datapath patterns of the set of datapath patterns match the identifier for the data file;
    comparing each of the two or more datapath patterns to the identifier:
    computing a similarity between each of the two or more datapath patterns; and
    selecting the datapath pattern using the similarity.

4. The method of claim 3, wherein computing a similarity between each of the two or more datapath patterns comprises:
    identifying a number of nodes in a hierarchical structure that correspond to the identifier;
    identifying two or more sets of nodes from a plurality of nodes, wherein each set of nodes from the two or more sets of nodes that each corresponds to different datapath patterns;
    performing a node-wise comparison of the number of nodes in the hierarchical structure and each set of nodes from the two or more sets of nodes;
    determining a percentage of the number of nodes in the hierarchical structure that match one or more nodes of each set of nodes; and
    selecting the datapath pattern with a greater percentage of matching nodes.

5. The method of claim 1, further comprising:
    accessing a node-based index associated with a file location and a creator;
    generating a set of linked metadata for each datapath pattern using the node-based index and the creator, the set of linked metadata comprising:
    a retention policy;

the metadata label; and
a set of owners that associates the datapath pattern to the creator.

6. A method of unstructured data management, the method comprising:
identifying a file in an unstructured data storage, wherein the file has an associated file path;
retrieving an index of datapath patterns from a metadata store, wherein an element of the index corresponds to a portion of a file path and the index is built by receiving a plurality of datapath patterns into the metadata store, identifying a pruning key to each datapath pattern of a plurality of datapath patterns, wherein the pruning key is a static portion of each datapath pattern, removing the pruning key from each datapath pattern of the plurality of datapath patterns, and in response to removing the pruning key, adding each datapath pattern to the index;
determining the plurality of datapath patterns from the index using the file path and one or more elements of the index;
resolving, from the plurality of datapath patterns, a selected datapath pattern, the resolving comprising, using an index of datapath patterns:
comparing each datapath pattern of the plurality of datapath patterns with the file path; and
determining the selected datapath pattern by matching one or more portions of the file path with one or more portions of each of the plurality of datapath patterns;
generating a set of metadata including a retention policy and the datapath pattern for the file; and
storing, in the metadata store, the set of metadata.

7. The method of claim 6, wherein determining the selected datapath pattern by matching one or more portions of the file path with one or more portions of each of the plurality of datapath patterns comprises:
determining two or more datapath patterns of the set of datapath patterns match the identifier for the file;
comparing each of the two or more datapath patterns to the identifier:
computing a similarity between each of the two or more datapath patterns; and
selecting the datapath pattern using the similarity.

8. The method of claim 7, wherein computing a similarity between each of the two or more datapath patterns comprises:
identifying a number of nodes in a hierarchical structure that correspond to the identifier:
identifying two or more sets of nodes from a plurality of nodes, wherein each set of nodes from the two or more sets of nodes that each corresponding to different datapath patterns:
performing a node-wise comparison of the number of nodes in the hierarchical structure and each set of nodes from the two or more sets of nodes;
determining a percentage of the number of nodes in the hierarchical structure that match one or more nodes of each set of nodes; and
selecting the datapath pattern with a greater percentage of matching nodes.

9. The method of claim 6, wherein the file has an associated file path comprises accessing a node-based index associated with a file location and a creator.

10. The method of claim 6, wherein a datapath pattern includes a set of linked metadata comprising:
a metadata label; and
a set of owners that associates the datapath pattern to one or more creators.

11. A system comprising:
at least one memory device; and
a processing device, operatively coupled with the at least one memory device, to:
select a set of datapath patterns;
build an index from the selected set of datapath patterns, wherein a datapath pattern comprises a reference to at least one particular portion of a file path and the index is built by receiving a plurality of datapath patterns from the set of datapath patterns, identifying a pruning key to each of the datapath patterns of the plurality of datapath patterns, wherein the pruning key is a static portion of each datapath pattern, removing the pruning key from each datapath pattern of the plurality of datapath patterns, and in response to removing the pruning key, adding each datapath pattern to the index;
receive an identifier for a data file;
use the index to match the identifier to a datapath pattern of the set of datapath patterns;
determine a metadata label associated with the datapath pattern; and
associate the metadata label with the data file.

12. The system of claim 11, wherein the metadata label includes a reference to a file retention policy.

13. The system of claim 11, wherein matching the identifier to the datapath pattern of the set of datapath patterns causes the processing device to:
determine two or more datapath patterns of the set of datapath patterns match the identifier for the data file;
compare each of the two or more datapath patterns to the identifier;
compute a similarity between each of the two or more datapath patterns; and
select the datapath pattern using the similarity.

14. The system of claim 13, wherein computing a similarity between each of the two or more datapath patterns causes the processing device to:
identify a number of nodes in a hierarchical structure that correspond to the identifier:
identify two or more sets of nodes from a plurality of nodes, wherein each set of nodes from the two or more sets of nodes that each corresponding to different datapath patterns;
perform a node-wise comparison of the number of nodes in the hierarchical structure and each set of nodes from the two or more sets of nodes;
determine a percentage of the number of nodes in the hierarchical structure that match one or more nodes of each set of nodes; and
select the datapath pattern with a greater percentage of matching nodes.

15. The system of claim 11, the processing device, operatively coupled with the at least one memory device, further to:
access a node-based index associated with a file location and a creator;
generate a set of linked metadata for each datapath pattern in the set of datapath patterns using the node-based index and the creator, the set of linked metadata comprising:
a retention policy:
the metadata label; and a set of owners that associates the datapath pattern to the creator.

* * * * *